US008573510B2

(12) United States Patent
Bisson et al.

(10) Patent No.: US 8,573,510 B2
(45) Date of Patent: Nov. 5, 2013

(54) DRIFT SHROUD SYSTEM FOR SPRAY BOOMS OF TURF SPRAYER

(75) Inventors: Robert J. Bisson, Savage, MN (US); Brannon W. Polk, Evansville, IN (US); David J. Norlander, Cottage Grove, MN (US); Timothy P. Sosnowski, Eden Prairie, MN (US); Bart T. Ellson, Excelsior, MN (US)

(73) Assignee: The Toro Company, Bloomington, MN (US)

( * ) Notice: Subject to any disclaimer, the term of this patent is extended or adjusted under 35 U.S.C. 154(b) by 481 days.

(21) Appl. No.: 12/907,401

(22) Filed: Oct. 19, 2010

(65) Prior Publication Data

US 2012/0091227 A1 Apr. 19, 2012

(51) Int. Cl.

| | |
|---|---|
| ***B05B 1/28*** | (2006.01) |
| ***B05B 15/04*** | (2006.01) |
| ***B05B 1/20*** | (2006.01) |
| ***A01G 25/09*** | (2006.01) |

(52) U.S. Cl.
USPC ........ 239/288.3; 239/159; 239/164; 239/166; 239/167; 239/168; 239/172; 239/288

(58) Field of Classification Search
USPC ......... 239/159, 164, 166, 167, 168, 172, 176, 239/288, 288.3, 288.5
See application file for complete search history.

(56) References Cited

U.S. PATENT DOCUMENTS

| | | | | |
|---|---|---|---|---|
| 3,512,714 | A * | 5/1970 | Bell et al. | 239/168 |
| 4,186,879 | A | 2/1980 | Kinder | |
| 4,215,758 | A | 8/1980 | Jones | |
| 4,641,781 | A | 2/1987 | McCrea et al. | |
| 5,156,338 | A * | 10/1992 | Borland et al. | 239/288 |
| 5,520,335 | A * | 5/1996 | Claussen et al. | 239/104 |
| 7,063,273 | B2 * | 6/2006 | Hahn et al. | 239/159 |
| 7,364,096 | B1 | 4/2008 | Sosnowski | |

OTHER PUBLICATIONS

Redball 620 Trailer Sprayer and 640 Three Point Broadcast Sprayer Website Printouts, dated at least as early as Apr. 23, 2004, disclosing Spray Hood Options.

* cited by examiner

*Primary Examiner* — Ryan Reis
(74) *Attorney, Agent, or Firm* — James W. Miller

(57) ABSTRACT

A turf sprayer has a truss shaped center boom and a pair of pivotal truss shaped wing booms within which spaced spray nozzles are supported. A drift shroud system comprises three integral and one-piece drift shrouds comprising a center shroud for the center boom and a pair of side shrouds for the wing booms. Each shroud is attached to an underside of the corresponding boom in a manner such that the shrouds project below the booms and not substantially above the booms to leave the truss-shapes of the booms open and unobscured to provide access to the spray nozzles within the booms. The shrouds each have openings in a top wall thereof for receiving the spray exiting from the nozzles with the spray passing downwardly between spaced front and rear walls of the shrouds.

11 Claims, 4 Drawing Sheets

DRIFT SHROUD SYSTEM FOR SPRAY BOOMS OF TURF SPRAYER

TECHNICAL FIELD

This invention relates to a turf sprayer for spraying a liquid on a turf surface and, more particularly, to drift shrouds used on such a sprayer for minimizing undesired drift of the liquid.

BACKGROUND OF THE INVENTION

U.S. Pat. No. 7,364,096 to Sosnowski et al., which is assigned to The Toro Company, the assignee of this invention, discloses a sprayer for applying a liquid, such as a fertilizer, insecticide or herbicide, to a turf surface. The sprayer includes a fixed center boom and a pair of pivotal wing booms that carry spaced spray nozzles along their lengths. In a spray position, the center and wing booms are substantially horizontal and aligned end-to-end along a substantially straight lateral axis with respect to the vehicle that carries the spray booms. In a transport position, the wing booms are folded upwardly and inwardly relative to the center boom until the wing booms become disposed in an X-shaped orientation when they reach the transport position.

It would be desirable for many reasons to minimize drift of the liquid being sprayed from the spray nozzles during operation of the sprayer. While various types of shrouds or shields have been disclosed for use with sprayers to attempt to solve the problem of spray drift, previously known shrouds or shields have been expensive to manufacture as well as bulky, cumbersome, difficult and time consuming to assemble or install.

For example, many known sprayers include two sets of booms that can be installed on a given sprayer, namely a first set comprising a plurality of open booms with no shrouds or shields and a second set comprising a plurality of shrouded booms. The sprayer is typically sold by the manufacturer with the set of open booms as standard equipment. The set of shrouded booms is typically offered as an option for purchase at an additional cost by the user. The user typically will purchase one or the other of these sets of booms and use the sprayer with just the purchased set of booms. Obviously, this limits use of the sprayer in some situations. For example, if the user purchases the set of open booms and installs this set of the sprayer, the user may have to wait until there is no or little wind to operate the sprayer in order to avoid undesired spray drift.

If the user wishes to address the problem of spray drift while maintaining the ability to use open booms, the user theoretically could purchase both sets of booms and then use whatever set of booms is dictated by the conditions at the time the liquid is being sprayed. However, as a practical matter, this is not often done. For one thing, it necessitates the purchase of two different sets of booms which is expensive. It also requires at least several hours of time and effort to change or swap out one set of booms for another to switch back and forth between an open boom style and a shrouded boom style. In addition, it requires the operator of the sprayer to have sufficient storage space to store the unused set of booms. For all these reasons, having two sets of booms, one open and one shrouded, and swapping the shrouded set for the open set when one wants to contain spray drift is not a cost effective practice.

Therefore, it would be an advance in the art to be able to convert a sprayer to a shrouded boom configuration in a simpler, faster and less expensive manner.

SUMMARY OF THE INVENTION

One aspect of this invention relates to a sprayer for spraying a liquid onto a turf surface. The sprayer comprises a mobile frame having ground engaging wheels for rolling over the ground to traverse the turf surface. At least one spray boom is carried on the frame and extends laterally relative to a fore-and-aft direction of motion of the frame. The boom has a plurality of liquid spray nozzles carried thereon which nozzles are spaced apart along a length of the boom with tips of the spray nozzles being directed vertically downwardly during a spraying operation towards the turf surface. The boom is made as a sufficiently rigid structure to carry the weight of the spray nozzles and to support various hoses and fittings that supply the spray nozzles with liquid. A drift shroud is provided having a top wall and downwardly extending front and rear walls that form a downwardly facing U-shaped spray confining channel. The drift shroud has a plurality of holes in the top wall thereof for receiving at least the tips of the spray nozzles carried on the boom such that the tips of the spray nozzles are located at or below the top wall of the drift shroud when the drift shroud is installed on the boom. The drift shroud is installed on the boom by releasably fastening the top wall of the drift shroud to an underside of the boom such that the drift shroud hangs below the boom but does not extend substantially above the boom.

Another aspect of this invention relates to a turf sprayer which comprises a truss shaped center boom and a pair of pivotal truss shaped wing booms within which spaced spray nozzles are supported. A drift shroud system is provided comprising three integral and one-piece drift shrouds comprising a center shroud for the center boom and a pair of side shrouds for the wing booms. Each shroud is attached to the corresponding boom in a manner such that the shrouds project below the booms and not substantially above the booms to leave the truss-shapes of the booms open and unobscured to provide easy viewing of or access to the spray nozzles within the booms. The shrouds each have openings in a top thereof for receiving the spray exiting from the nozzles with the spray passing downwardly between spaced front and rear walls of the shrouds.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

Figure 1:
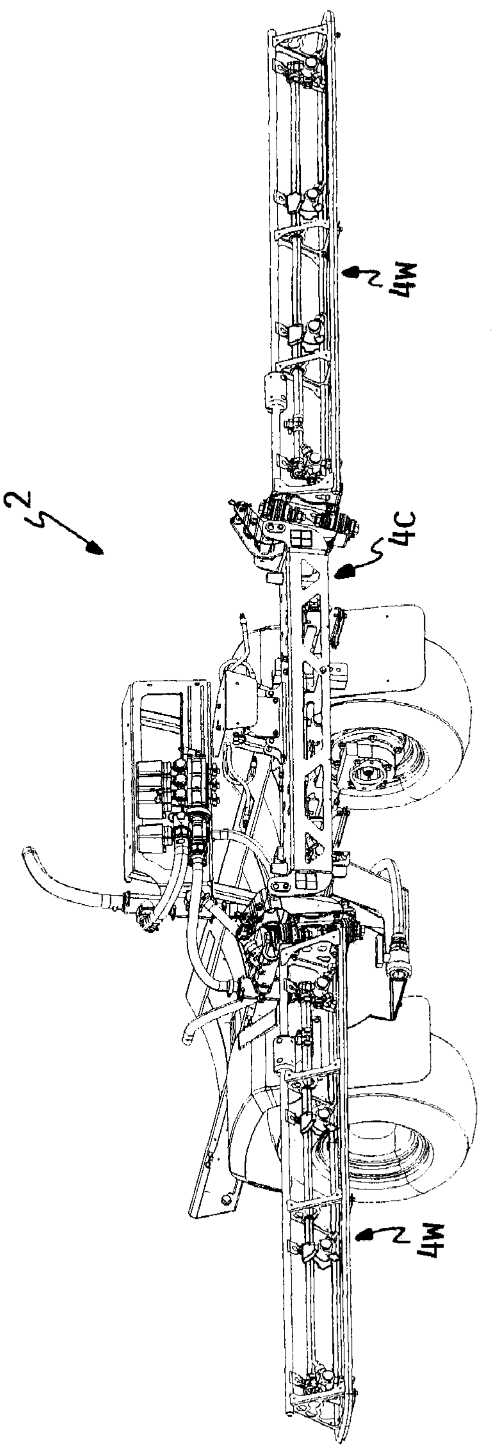
FIG. 1 is a perspective view of a portion of a prior art sprayer for spraying liquids onto a turf surface.
Figure 2:
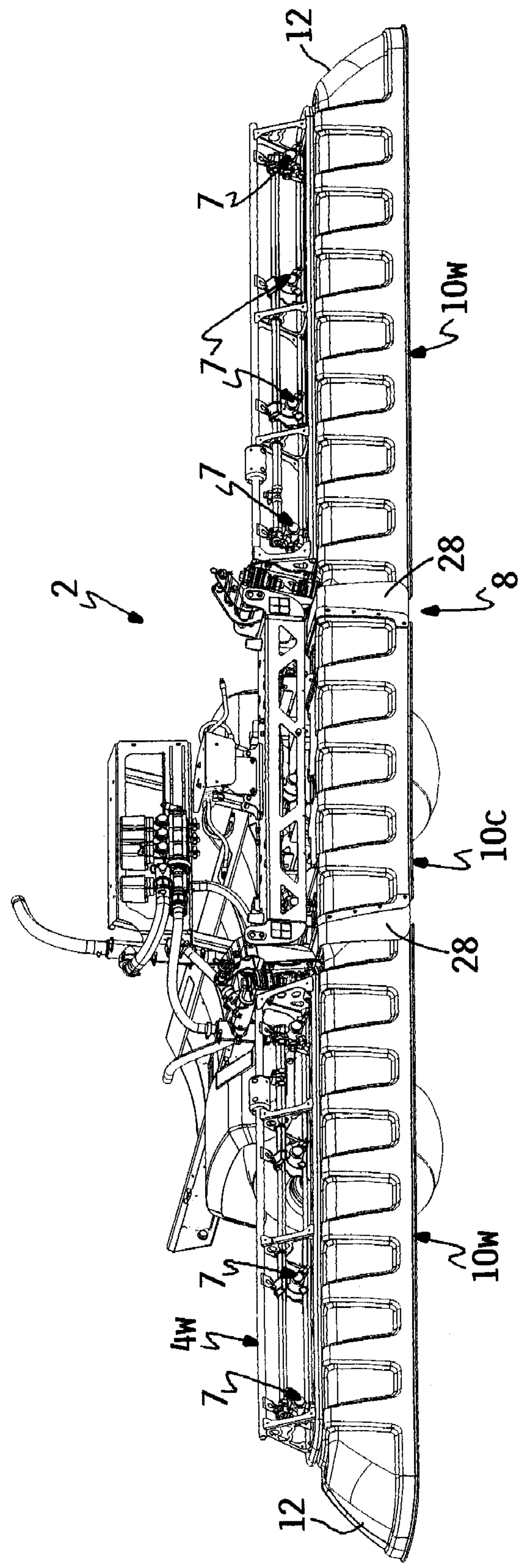
FIG. 2 is a perspective view similar to FIG. 1, but showing the sprayer equipped with the drift shroud system of this invention.

FIG. 1 depicts a portion of the rear of a sprayer 2 previously manufactured and sold by The Toro Company, the assignee of this invention. Sprayer 2 is of the type disclosed in U.S. Pat. No. 7,364,096, also assigned to Toro, which is hereby incorporated by reference. FIG. 1 depicts sprayer 2 in an open boom configuration as known in the prior art without sprayer 2 having the drift shroud system of this invention. FIG. 2 depicts sprayer 2 with the drift shroud system of this invention installed thereon.

Referring to FIG. 1 and by way of background, sprayer 2 includes a fixed center boom 4*c* and a pair of wing booms 4*w* that are pivotally connected to opposite ends of center boom 4*c*. Center boom 4*c* has a square or rectangular cross-section and each wing boom 4*w* has a triangular cross-section. Each boom 4 comprises a relatively open truss like structure formed from a plurality of interconnected or joined structural members.

Each boom 4 carries a plurality of spray nozzles 6 spaced across the length thereof for spraying a liquid, such as a fertilizer, herbicide, pesticide or the like, onto a turf surface. FIG. 1 illustrates booms 4 in a horizontal spray position in which wing booms 4*w* are unfolded and are aligned end-to-end with center boom 4*c* such that booms 4 spray liquid over a swath having a width defined by the aggregate length of all booms 4. In the spray position, wing booms 4*w* extend substantially beyond the side sides of a self-propelled vehicle which carries booms 4. To reduce the width of sprayer 2 for transport purposes, wing booms 4*w* can be pivotally folded up into a compact X-shape (not shown) in which wing booms 4*w* are behind the vehicle and are disposed above center boom 4*c*.

Figure 3:
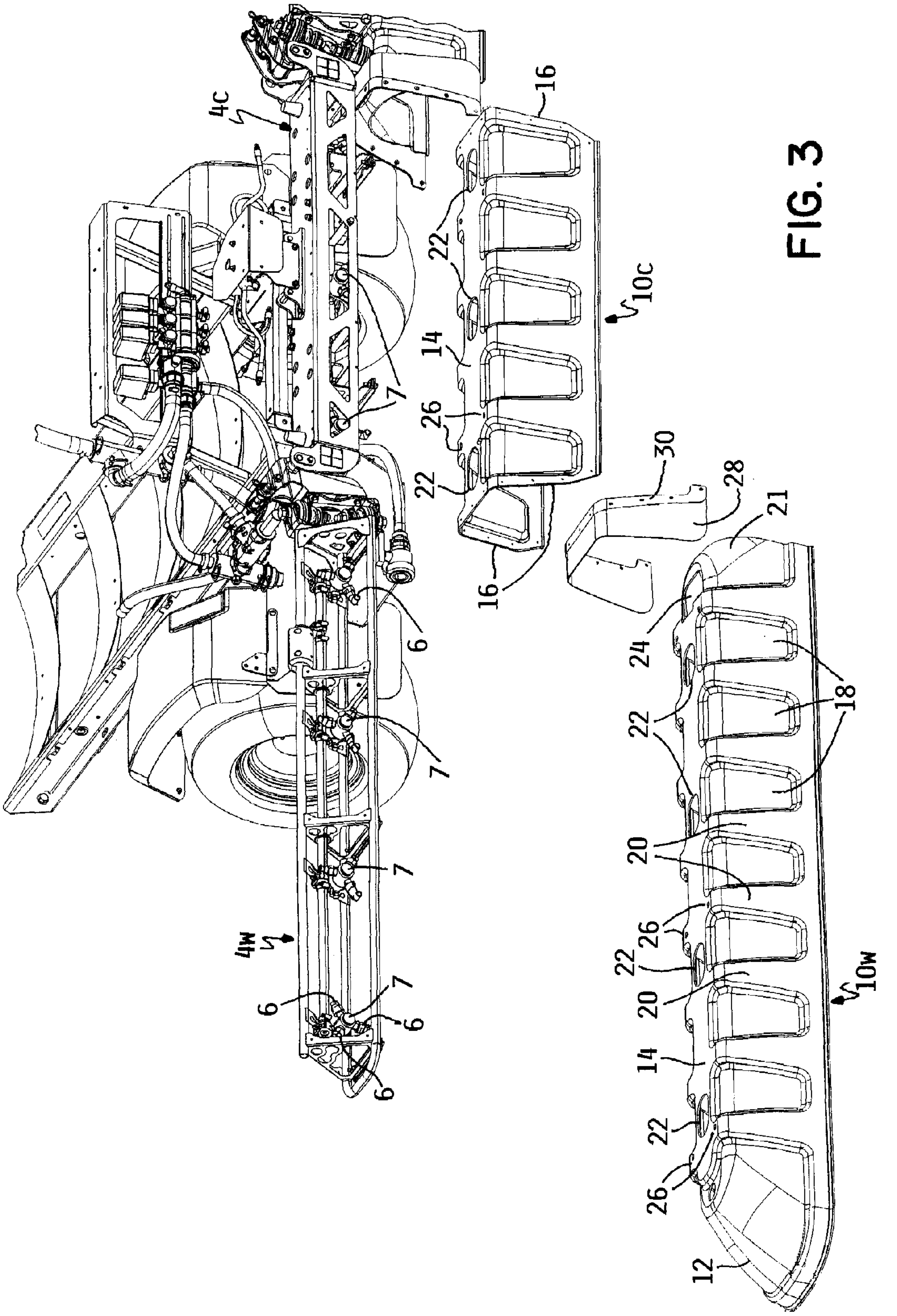
FIG. 3 is an enlarged perspective view of the drift shroud system of this invention, particularly illustrating one of the side shrouds, one of the boots, and the center shroud in an exploded form having been removed from one of the wing booms and the center boom.
Figure 4:
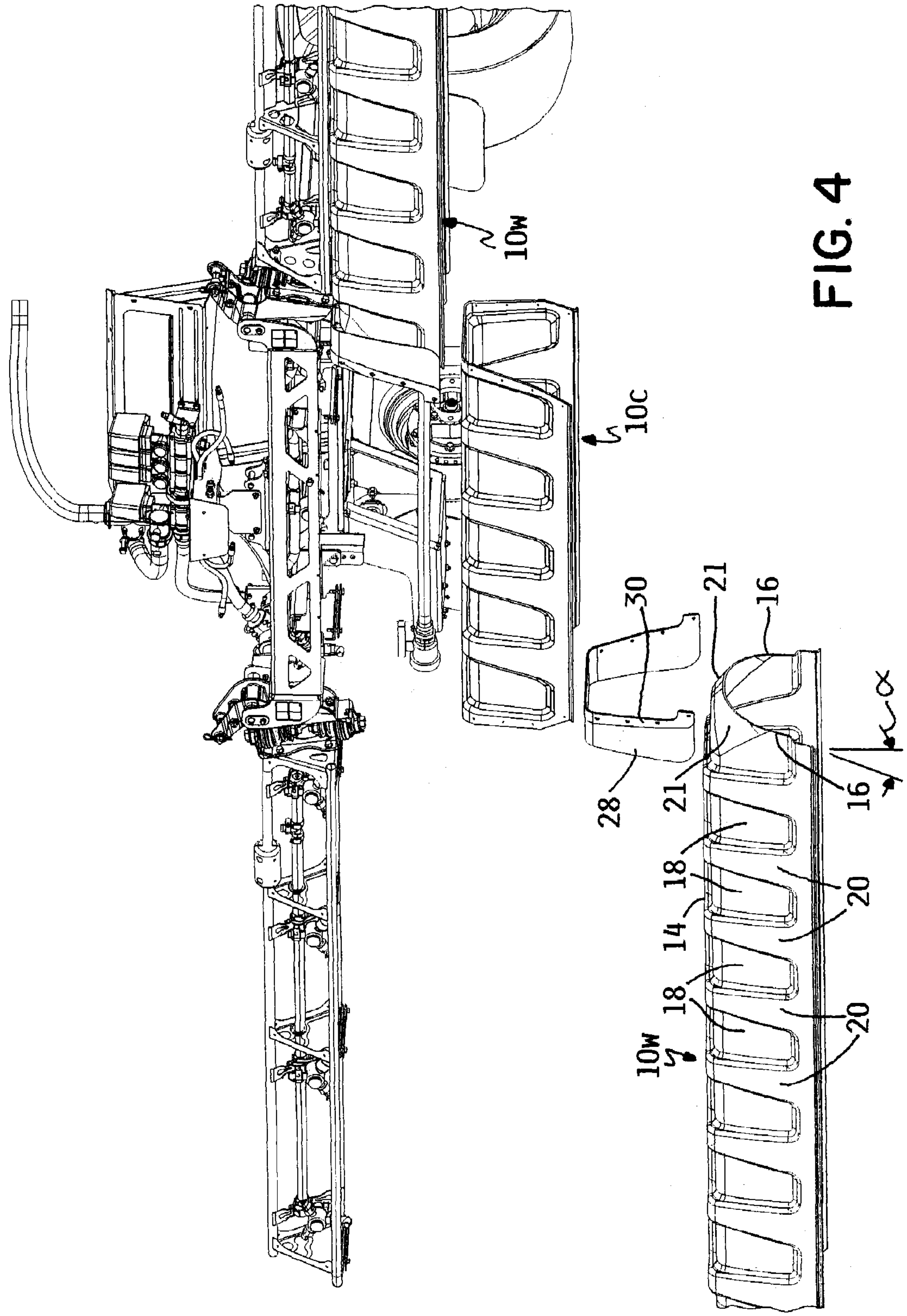
FIG. 4 is an enlarged perspective view similar to FIG. 3, but showing the exploded portions of the drift shroud system from a different angle to illustrate the open inner end of the side shroud.

Referring now to FIGS. 2-4, the drift shroud system 8 of this invention comprises three drift shrouds 10, i.e. a center shroud 10*c* mounted to the underside of center boom 4*c* and a pair of wing or side shrouds 10*w* mounted to the undersides of wing booms 4*w*. Shrouds 10 all substantially conform to the length of boom 4 on which they are mounted with center shroud 10*c* being shorter than either of side shrouds 10*w* due to the shorter length of center boom 4*c* relative to wing booms 4*w*. Each shroud 10 is a one-piece, integrally molded plastic member that is simply bolted or otherwise fastened by suitable fasteners as an integral piece to the underside of its corresponding boom. Shrouds 10 need not supply any structural strength and need not support any of spray nozzles 6 or the hoses for supplying spray nozzles 6 as all that is already done by booms 4 themselves, thereby allowing shrouds 10 to be light weight. Thus, sprayer 2 can be quickly converted to a shrouded boom configuration through the simple attachment of just three shrouds 10 to the undersides of booms 4 without having to disconnect hoses, remove spray nozzles, or the like.

Side shrouds 10*w* are identical to one another and, in fact, are the same molded piece. The only difference is how side shrouds 10*w* are mounted. As shown in FIG. 2, side shroud 10*w* at the left of FIG. 2 is mounted to the left wing boom with its rounded and enclosed outer end 12 being inclined and extending outwardly beyond the free end of the left wing boom. Side shroud 10*w* at the right of FIG. 2 is the same molded piece as that used at the left of FIG. 2, but spun or rotated 180° around in a horizontal plane, in order to locate the same rounded outer end 12 at the free end of the right wing boom. In fact, center shroud 10*c* is also made from the same molded piece as side shrouds 10*w* with the only change being that various portions of each end of the molded piece are trimmed off to form the shorter length of center shroud 10*c*. This use of a single molded piece to derive all three shrouds 10 reduces the cost and complexity of drift shroud system 8.

Referring to FIG. 3, each shroud 10 is in the form of a downwardly facing, generally U-shaped channel having a top wall 14 and downwardly extending front and rear walls 16. Front and rear walls 16 taper or incline slightly outwardly as they extend downwardly from top wall 10 at an angle $\alpha$ in the range of from 10°-30° and preferably about 20° relative to vertical. Front and rear walls 16 of shrouds 10 are molded with a plurality of inverted, truncated, trapezoidal shaped recesses 18 separated by upright, truncated, trapezoidal shaped ridges or lands 20 spaced along the lengths of shrouds 10 to provide increased strength to shrouds 10.

Side shrouds 10*w* are enclosed at their outer ends by the rounded outer end 12 referred to previously. Center shroud 10*c* has no such enclosed end as the rounded and enclosed outer end 12 is severed and discarded when center shroud 10*c* is being formed by cutting or trimming off the unneeded ends of one of the side shrouds 10*w*. Thus, center shroud 10*c* is open at each end thereof. While the inner end of each side shroud 10*w* has a rounded upper side 21, the inner end of each side shroud 10*w* is open as shown in FIG. 4. Only the outer end 12 of side shrouds 10*w* is substantially enclosed.

Top wall 14 of each side shroud 10*w* is provided with a plurality of spaced nozzle receiving openings 22 that are wide enough along the length of the shroud to allow one spray nozzle 6 carried on a rotatable nozzle turret 7 to be rotated into place with a lower end or tip of spray nozzle 6 extending slightly beneath top wall 10 of the shroud. Nozzle turret 7 carries three spray nozzles 6 with the nozzle that is being used extending straight downwardly with the lower end of the in use nozzle 6 extending down through one nozzle receiving opening 22 in top wall 10. Opening 22 has to be sufficiently laterally elongated along the length of top wall 10 to allow the rotary motion of nozzle turret 7 to take place. As shown in FIG. 3, there are four such nozzle receiving openings 22 in each side shroud 10*w*, but only three such nozzle receiving openings 22 in center shroud 10*c*, to accommodate the different numbers of nozzle turrets 7 used on the different booms.

In addition to nozzle receiving openings 22 in side shrouds 10*w*, a clearance hole 24 is provided in top wall 14 at the inner end of each side shroud 10*w*. Clearance hole 24 is needed to receive therein the bottom of a portion of the pivot structure 26 that mounts each wing boom 4*w* to center boom 4*c*. Hole 24 is not needed on center shroud 10*c* and will be discarded when the shroud structure is trimmed to create center shroud 10*c*. Top wall 10 of each shroud 10 also includes a plurality of spaced fastener openings 26 for receiving the fasteners (not shown) that releasably attach each shroud 10 to the underside of the corresponding boom.

Drift shroud system 8 also includes a pair of flexible gaskets or boots 28 attached to the ends of center shroud 10*c* at the interfaces between the ends of center shroud 10*c* and side shrouds 10*w*. Each flexible boot 28 comprises a sheet of flexible material that is formed with or is bent into a generally U-shaped configuration that corresponds to but is slightly larger than the cross-sectional shapes of shrouds 10 to allow boot 28 to nest around the inner end of one side shroud 10*w*. A mounting flange 30 wraps around one end of boot 28 to help maintain the U-shape of boot 28 with mounting flange 30 also being used to secure boot 28 to one end of center boom 4*c* in any suitable manner, such as by bolts or rivets used at spaced locations along mounting flange 30.

When boots 28 are installed, there is one boot 28 on each end of center boom 4*c* with each boot 28 facing laterally outwardly to engage against and nest around the exterior of the inner end of each side shroud 10*w* when wing booms 4*w* are folded down into the spray position. When wing booms 4*w* are pivoted up into their transport position, the inner ends of wing booms 4*w* will disengage from boots 28. However, as wing booms 4*w* pivot back down from their transport positions to their spray positions, the rounded upper sides 21 of the inner ends of wing booms 4*w* help guide the inner ends of wing booms 4*w* back into boots 28 and the flexibility of boots 28 assists in receiving wing booms 4*w* without causing any damage. Boots 28 ensure that the spray confining channels formed by front and rear walls 16 of shrouds 10 are substantially unbroken across the collective span of booms 4. No spray can escape through gaps between the inner ends of wing booms 4*w* and the ends of center boom 4*c* because such gaps are closed or sealed off by boots 28.

Shrouds 10 extend down a substantial distance from the undersides of booms 4, e.g. approximately 12" or so, but terminate above the ground by approximately 8" or so. No gauge or support wheels are thus needed or used on the bottom of shrouds 10 to allow shrouds 10 to roll on the ground. When in use, shrouds 10 are simply held above the ground by their connection to the undersides of booms 4.

The size and position of shrouds 10 and their simple bolt on connection to the underside of booms 4 do not in any way hamper the ability of booms 4 to function in the manner taught by the 096 patent which is incorporated by reference herein. The shroud equipped wing booms 4*w* can still fold vertically upwardly into their X-shaped transport position relative to center boom 4*c* as taught in the 096 patent. Similarly, wing booms 4*w* can pivotally breakaway fore and aft in a horizontal plane should wing booms 4*w* hit any obstructions during movement of sprayer 10 as further taught in the 096 patent. No boom functionality is lost through use of shrouds 10.

When a low drift spray nozzle such as a TeeJet® Air Induction nozzle, manufactured and sold by TeeJet Technologies of Wheaton, Ill., is used as each spray nozzle 6, the Applicants have found that the drift shrouds 10 of this invention can reduce drift by up to 90% over unshrouded booms 4 using conventional flat fan spray nozzles.

Various modification of this invention will be apparent to those skilled in the art. Accordingly, the scope of this invention is to be limited only by the appended claims.

The invention claimed is:

1. A sprayer for spraying a liquid onto a turf surface, which comprises:

(a) a mobile frame having ground engaging wheels for rolling over the ground to traverse the turf surface;

(b) at least one spray boom carried on the frame and extending laterally relative to a fore-and-aft direction of motion of the frame, the boom having a plurality of liquid spray nozzles directly mounted and carried thereon and spaced apart along a length of the boom with tips of the spray nozzles being directed vertically downwardly during a spraying operation towards the turf surface, the boom further being made as a sufficiently rigid structure to directly bear the weight of the spray nozzles thereon and to additionally support various hoses and fittings thereon that supply the spray nozzles with liquid; and (c) a drift shroud having a top wall and downwardly extending front and rear walls that form a downwardly facing U-shaped spray confining channel, wherein the drift shroud has a plurality of holes in the top wall thereof for receiving at least the tips of the spray nozzles carried on the boom such that the tips of the spray nozzles are located at or below the top wall of the drift shroud when the drift shroud is installed on the boom, wherein the drift shroud is installed on the boom by releasably fastening the top wall of the drift shroud to an underside of the boom such that the drift shroud hangs below the boom but does not extend substantially above the boom, and wherein the drift shroud is free of any weight bearing attachment with or to the spray nozzles mounted on the boom when the drift shroud is installed on the underside of the boom.

2. The sprayer of claim 1, wherein the drift shroud is an integral, one-piece member that extends along substantially the entire length of the boom when installed.

3. The sprayer of claim 2, wherein the drift shroud is integrally molded out of a plastic material.

4. The sprayer of claim 1, wherein the mobile frame has a center boom and a pair of pivotal wing booms that fold and unfold relative to the center boom with the wing booms having a spray position in which the wing booms are aligned end-to-end with the center boom and with the wing booms further having a transport position in which the wing booms are pivoted upwardly into a raised position relative to the center boom, and wherein a plurality of drift shrouds of the type set forth in claim 2 comprising a center shroud and a pair of side shrouds are attached to the undersides of the center and wing booms, respectively.

5. The sprayer of claim 4, wherein the side shrouds are integrally molded as a one-piece member and are identical to one another.

6. The sprayer of claim 5, wherein the one-piece member forming the side shrouds has an outer end that is enclosed to the passage of liquid and an open inner end, and wherein the side shrouds are mounted to the undersides of the wing booms with the outer end of each side shroud being directly proximate to and beneath an outer end of each wing boom.

7. The sprayer of claim 6, wherein the outer end of each side shroud extends laterally outwardly past the outer end of each wing boom with the outer end inclining downwardly as it extends outwardly.

8. The sprayer of claim 6, wherein the center boom and center shroud are shorter than the wing booms and the side shrouds, and wherein the center shroud is formed from the same one-piece member forming the side shrouds by trimming off opposite ends of the one-piece member to use only an intermediate and shorter portion of the one-piece member as the center shroud.

9. The sprayer of claim 4, further including a pair of downwardly facing, U-shaped, flexible boots between each end of the center shroud and an inner end of an adjacent side shroud, the U-shape of the flexible boots being disposed in a nested arrangement relative to the U-shaped spray confining channel of the adjacent drift shroud to form a substantially unbroken continuation of the channel between the side and center shrouds.

10. A turf sprayer which comprises:

(a) a truss shaped center boom and a pair of pivotal truss shaped wing booms within which spaced spray nozzles are supported;

(b) a drift shroud system comprising:

(i) three integral and one-piece drift shrouds comprising a center shroud for the center boom and a pair of side shrouds for the wing booms;

(ii) wherein each shroud is attached to the corresponding boom in a manner such that the shrouds project below the booms and not substantially above the booms to leave the truss-shapes of the booms open and unobscured to provide easy viewing of or access to the spray nozzles within the booms; and (iii) wherein the shrouds each have openings in a top thereof for receiving the spray exiting from the nozzles with the spray passing downwardly between spaced front and rear walls of the shrouds.

11. A sprayer for spraying a liquid onto a turf surface, which comprises:

(a) a mobile frame having ground engaging wheels for rolling over the ground to traverse the turf surface;

(b) a center boom and a pair of pivotal wing booms carried on the frame and extending laterally relative to a fore-and-aft direction of motion of the frame, each of the booms having a plurality of liquid spray nozzles carried thereon and spaced apart along a length of the boom with tips of the spray nozzles being directed vertically downwardly during a spraying operation towards the turf surface, wherein the pair of pivotal wing booms fold and unfold relative to the center boom with the wing booms having a spray position in which the wing booms are aligned end-to-end with the center boom and with the wing booms further having a transport position in which the wing booms are pivoted upwardly into a raised position relative to the center boom;

(c) a plurality of drift shrouds comprising a center drift shroud and a pair of side drift shrouds that are attached to the center and wing booms, respectively, each drift shroud having a top wall and downwardly extending front and rear walls that form a downwardly facing U-shaped spray confining channel, wherein each drift shroud has a plurality of holes in the top wall thereof for receiving at least the tips of the spray nozzles carried on its respective boom such that the tips of the spray nozzles are located at or below the top wall of the drift shroud when the drift shroud is installed on its respective boom, and wherein each drift shroud is installed on its respective boom by releasably fastening the top wall of the drift shroud to an underside of its respective boom such that the drift shroud hangs below its respective boom but does not extend substantially above its respective boom; and (d) a pair of downwardly facing, U-shaped, flexible boots between each end of the center drift shroud and an inner end of an adjacent side shroud, the U-shape of the flexible boots being disposed in a nested arrangement relative to the U-shaped spray confining channel of the adjacent drift shroud to form a substantially unbroken continuation of the channel between the side and center drift shrouds.

* * * * *